US009980130B2

(12) United States Patent
Rayment et al.

(10) Patent No.: US 9,980,130 B2
(45) Date of Patent: May 22, 2018

(54) SESSION AND SERVICE CONTROL FOR WIRELESS DEVICES USING COMMON SUBSCRIBER INFORMATION

(71) Applicant: TELEFONAKTIEBOLAGET LM ERICSSON (PUBL), Stockholm (SE)

(72) Inventors: Stephen Rayment, Ottawa (CA); Xuan Chen, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days. days.

(21) Appl. No.: 14/546,290

(22) PCT Filed: Oct. 21, 2014

(86) PCT No.: PCT/IB2014/065511
§ 371 (c)(1),
(2) Date: Nov. 18, 2014

(87) PCT Pub. No.: WO2015/114420
PCT Pub. Date: Aug. 6, 2015

(65) Prior Publication Data
US 2016/0037340 A1 Feb. 4, 2016

Related U.S. Application Data

(60) Provisional application No. 61/934,816, filed on Feb. 2, 2014.

(51) Int. Cl.
*H04W 12/06* (2009.01)
*H04L 29/06* (2006.01)
(Continued)

(52) U.S. Cl.
CPC ......... *H04W 12/06* (2013.01); *H04L 63/0853* (2013.01); *H04W 76/022* (2013.01);
(Continued)

(58) Field of Classification Search
CPC ... H04W 12/08; H04W 76/022; H04W 12/06; H04W 76/02; H04W 76/021;
(Continued)

(56) References Cited

U.S. PATENT DOCUMENTS 6,662,231 B1 * 12/2003 Drosset ............. G06F 17/30017
707/E17.009
7,633,909 B1 * 12/2009 Jones .................. H04L 63/0272
370/338
(Continued)

FOREIGN PATENT DOCUMENTS

WO WO2011/014043 A2 2/2011

OTHER PUBLICATIONS

3GPP TS 23.234, V11.0.0, Sep. 2012: "3GPP System to Wireless Local Network (WLAN) Interworking".
(Continued)

*Primary Examiner* — Michael Thier
*Assistant Examiner* — Rownak Islam
(74) *Attorney, Agent, or Firm* — Christopher & Weisberg, P.A.

(57) ABSTRACT

The present disclosure provides a method and apparatus to initiate a session with a packet gateway for a connecting device configured to authenticate with a subscribing wireless device's authentication information. In some embodiments, an access node is configured to receive identification information uniquely identifying the connecting device, and based on the identification information received, provide a service to the connecting device and/or send a session request message to the packet gateway to establish a session for the connecting device, the session request message including information distinguishing the connecting device (Continued)

from another wireless device configured to authenticate with the authentication information associated with the subscribing wireless device.

28 Claims, 8 Drawing Sheets

(51) Int. Cl.
  *H04W 76/02* (2009.01)
  *H04W 84/12* (2009.01)
  *H04W 88/06* (2009.01)
(52) U.S. Cl.
  CPC .......... *H04W 76/023* (2013.01); *H04W 76/02* (2013.01); *H04W 84/12* (2013.01); *H04W 88/06* (2013.01)
(58) Field of Classification Search
  CPC ... H04W 76/00; H04W 76/023; H04W 84/12; H04W 88/06; H04W 88/08; H04L 63/083; H04L 63/0876; H04L 63/0853; H04L 63/08; H04L 63/0869; H04L 63/0892
  USPC ........................................ 370/338, 328, 329
  See application file for complete search history.

(56) References Cited

U.S. PATENT DOCUMENTS

| | | | | |
|---|---|---|---|---|
| 2012/0240197 | A1* | 9/2012 | Tran .................... | H04L 63/1416 726/4 |
| 2013/0104207 | A1* | 4/2013 | Kroeselberg .......... | H04W 12/06 726/6 |
| 2013/0155851 | A1* | 6/2013 | Koodli .................. | H04L 45/308 370/230 |
| 2014/0003357 | A1* | 1/2014 | Ejzak .................. | H04W 76/021 370/329 |
| 2014/0078967 | A1* | 3/2014 | Turanyi ................ | H04W 8/082 370/328 |
| 2015/0063126 | A1* | 3/2015 | Korhonen ........... | H04L 63/0892 370/242 |

OTHER PUBLICATIONS

PCT/IB2014/065511—International Search Report.
3GPP TS 23.402, V12.3.0, Dec. 2013: "Architecture enhancements for non-3GPP accesses".
3GPP TS 33.234, V11.4.0, Jun. 2012: "Wireless Local Area Network (WLAN) interworking security".
3GPP TS 23.003, V11.6.0, Sep. 2013: "Numbering, addressing and identification".
IEEE 802.11-2012: "IEEE Standard for Information technology—Telecommunications and information exchange between systems—Local and metropolitan area networks—Specific requirements—Part 11: Wireless LAN Medium Access Control (MAC) and Physical Layer (PHY) specifications".
IEEE 802.1X-2010: "IEEE Standard for Local and metropolitan area networks—Port-Based Network Access Control".
3GPP TS 29.273, V11.7.0, Sep. 2013: "3GPP EPS AAA interfaces".
IETF RFC 3579, Sep. 2003: "RADIUS (Remote Authentication Dial in User Service) Support for Extensible Authentication Protocol (EAP)".
3GPP TS 29.274, V11.7.0, Jun. 2013: "3GPP Evolved Packet System (EPS); Evolved General Packet Radio Service (GPRS) Tunneling Protocol for Control plane (GTPv2-C); Stage 3".
"Multi-device login with mobile phone as location-based "security key"", Innovative WiFi Offload Features, Aptilo, pp. 1-5.
Do, Ngoc et al., "CrowdMAC: A crowd sourcing System for Mobile Access", Dept. of Information and Computer Science, University of California, Irvine, USA., pp. 1-20.
Sharma, A. et al., "Cool-Tether: Energy Efficient On-the-fly WiFi Hot-spots using Mobile Phones", University of California, Santa Barbara.

* cited by examiner

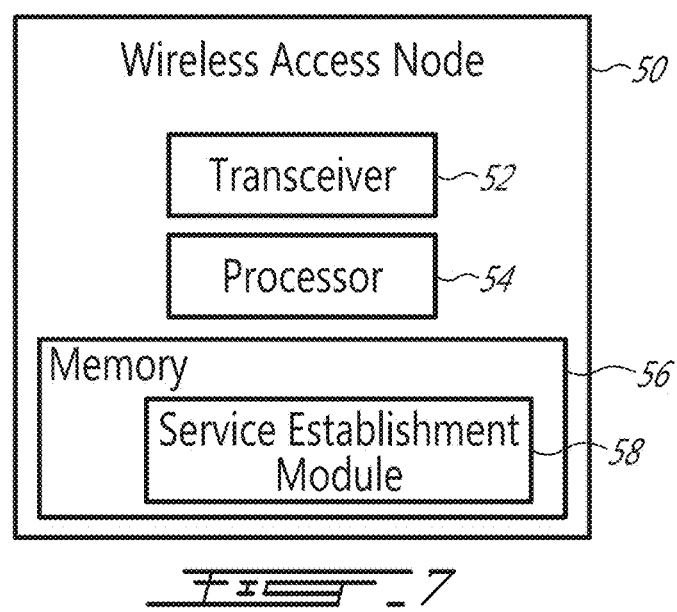
_Fig. 7_
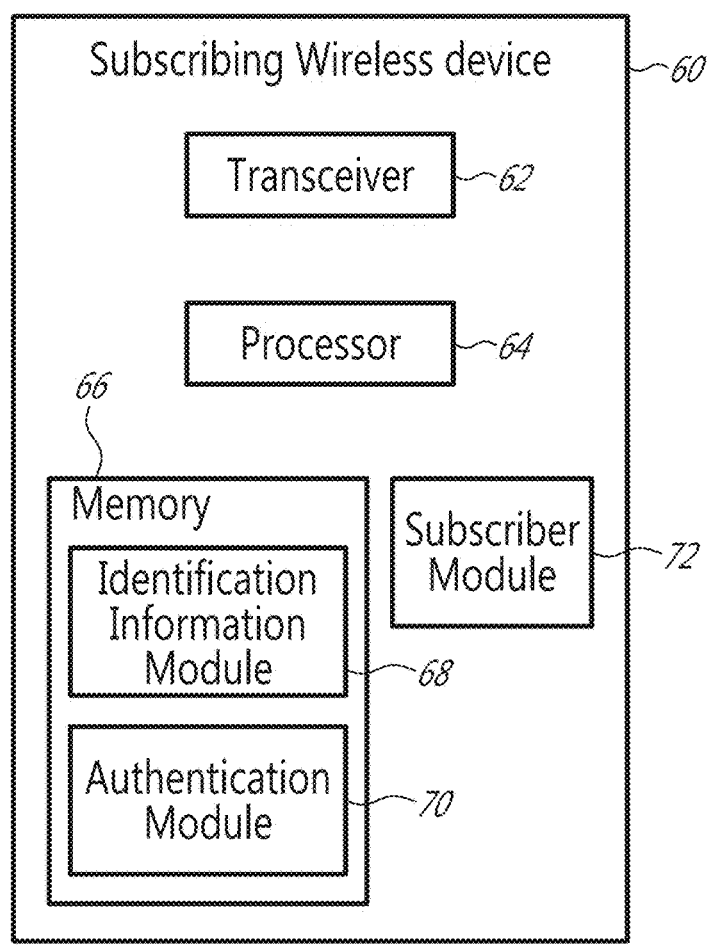
_Fig. 8_

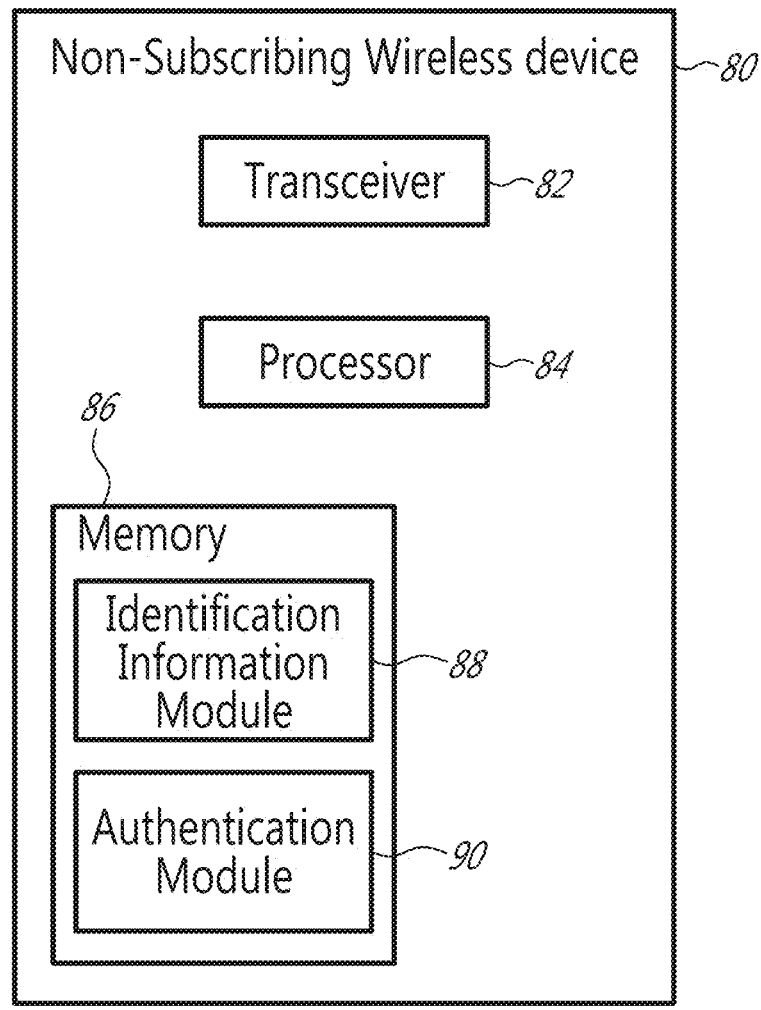

SESSION AND SERVICE CONTROL FOR WIRELESS DEVICES USING COMMON SUBSCRIBER INFORMATION

RELATED APPLICATIONS

This non-provisional application claims the benefit of U.S. provisional patent application Ser. No. 61/934,816, filed Feb. 2, 2014, the content of which is hereby incorporated by reference in its entirety.

TECHNICAL FIELD

The present disclosure relates to Wireless (e.g. Wi-Fi) Local Area Networks (WLANs), and in particular, the present disclosure relates to methods for differentiating between WLAN devices and a subscribing wireless device (such as a User equipment) when either or both are connected to a WLAN using the subscribing device's subscriber information.

BACKGROUND

In a cellular radio system (such as, by way of non-limiting example, 3GPP. LTE, 3G and 4G), wireless terminals (also known as mobile stations and/or user equipment units (UEs)) communicate via a radio access network (RAN) to one or more core networks (such as, by way of non-limiting example, the Evolved Packet Core (EPC) network).

UEs may be (by way of non-limiting example) mobile telephones ("cellular" telephones), desktop computers, laptop computers, tablet computers, and/or any other devices with wireless communication capability to communicate voice and/or data with a RAN. To access the cellular network, the UE has a Subscriber Identity Module (SIM) or Universal Integrated Circuit Card (UICC) that has an associated International Mobile Subscriber Identity (IMSI) and other subscriber information, which is assigned by the operator network to a subscriber. A UE with SIM/UICC credentials (hereinafter referred to as a subscribing wireless device/UE) can authenticate and operate in a RAN and gain access to core network services. In some examples, the SIM/UICC allows the UE to perform Extensible Authentication Protocol (EAP) authentication (including, without limitation, EAP-SIM, EAP-AKA, or EAP-AKA' protocols) against an operator's 3GPP AAA/HSS/HLR. When the UE is used for data communications via the RAN, the UE is assigned one or more Internet Protocol (IP) addresses. Some UEs are also capable of communicating data via a wireless local area network (WLAN). Such UEs are sometimes referred to as dual-mode UEs. This dual mode capability permits the UE to engage in data communications along a WLAN when and where available, to reduce the amount of data communications across the RAN, to gain better data throughput over the WLAN, and/or to reduce the fees charged over the RAN.

In some example embodiments, the data communications bandwidth available to the dual mode UE may be greater along a WLAN than along the RAN. In some example embodiments, the unit cost of data communications may be smaller along a WLAN than along the RAN. Thus, in some example embodiments, the dual mode UE may be permanently or in specific situations, or upon user preference or specification, configured to prefer data communications along a connected WLAN rather than along the RAN.

In some embodiments, network operators have deployed WLANs that substantially overlap a RAN or portion thereof. The WLAN together with the EPC, provide services including authentication, policy, charging and IP mobility for subscribing dual mode UEs and WLAN devices.

The architecture for so-called Trusted WLAN Access Networks (TWANs) is described in section 16.1.1 of 3GPP TS 23.402, V12.3.0, 2013-12: "Architecture enhancements for non-3GPP accesses" (TS 23.402), which is incorporated by reference in its entirety herein. The TWAN is interfaced with the EPC via the STa interface to the 3GPP AAA Server/Proxy and with the PDN Gateway (PGW) via the S2a interface.

FIG. 1 shows an example of a subscribing UE 10 configured to operate with an EPC 18 via a RAN node 20 (e.g. in the case of LTE, an eNodeB) in a RAN The EPC 18 includes a PGW 14 and an Authentication, Authorization and Accounting (AAA) server (or proxy) 16 which itself can connect with network resources of a home operator (e.g. Home Location Register (HLR)/Home Subscriber Server (HSS)) to perform AAA procedures for the UE 10. In that example, the subscribing UE 10 is a dual-mode device that is also configured to operate with the EPC 18 via a TWAN access node 12. The UE 10 also has a separate radio (not shown), by which it can operate as a Wi-Fi access point (e.g. a hotspot), enabling other WLAN (e.g. TWAN) devices (22, 24, 26) to connect to the UE 10 and employ the UE's data communications capabilities.

The UE 10 can also use its separate radio to connect to the EPC 18 via a TWAN node 12 in a TWAN (13). Connecting a WLAN device (22, 24, 26), including dual mode UE 10, to a WLAN, including a TWAN, involves selecting a Service Set Identifier (SSID) of the network and connecting thereto. In some example embodiments, the SSID of a WLAN is made visible so that it becomes available to any WLAN device in the network's coverage area, so that the WLAN device may automatically, or upon user input, select the SSID.

In some example embodiments, the WLAN does not make its SSID visible and is said to be hidden. Rather, the WLAN device knows and specifies the WLAN's SSID in order to connect to it.

WLANs may, in some example embodiments, be hidden. In some example embodiments, WLANs may establish an AAA procedure with a connecting dual mode UE (e.g. UE10), using EAP authentication against the operator's AAA/HSS/HLR, over the WLAN, as described in section 6.1 of 3GPP TS 33.234, V11.4.0, 2012-06: "Wireless Local Area Network (WLAN) interworking security" (TS 33.234), which is incorporated by reference herein in its entirety.

With successful authentication, the UE 10 is authorized to use its assigned IMSI to gain access to the operator's EPC 18 via the TWAN node 12 to obtain various EPC services or to receive other services offered by the operator at the TWAN such as a Non-seamless WLAN Offload (NSWO) service, as instructed by the AAA.

Turning now to FIG. 2, there is shown a signaling diagram demonstrating establishment of a GTP 32a session for a connecting device (in this case the subscribing UE 10) between the TWAN access node 12 and the PGW 14 of FIG. 1. Further details may be found in section 16.2.1 of TS 23.402, which is incorporated in its entirety herein. At step 1000, the UE 10 establishes an association with the TWAN access node 12. That procedure is governed by Section 4.10.3 of IEEE 802.11-2012 "IEEE Standard for Information Technology—Telecommunication and Information Exchange between Systems 802.11-2012-IEEE Standard for Information technology—Telecommunications and information exchange between systems Local and metropolitan area networks—Specific requirements Part 11: Wireless LAN Medium Access Control (MAC) and Physical Layer (PHY) Specifications. Once the UE is associated with the TWAN node 12, it then attempts to authenticate against the AAA server 16 at step 1002 using the UE's SIM/USIM credentials. The AAA server 16 then operates to retrieve user subscription and authentication information from a HSS/HLR server of a home operator (step 1003). After successful EAP authentication of the UE 10, the AAA server 16 sends the authorized IMSI (ie. the UE's IMSI) and other information (e.g. an APN) to the TWAN access node 12.

With that information, the TWAN access node 12 sends a Create Session Request message at step 1004 to the PGW 14 to establish an S2a session. The message contains the authorized UE's IMSI and an APN provided by the AAA server 16, as well as other parameters necessary to establish the S2a session such as, for example, an Evolved Packet System (EPS) Bearer Identity (e.g. EPS-ID-X) and a default EPS Bearer Quality of Service (QoS). The EPS Bearer Identity and default EPS Bearer QoS parameters convey the default S2a bearer QoS. In response, at step 1006, the PGW 14 returns a Create Session Response message to the TWAN node 12 containing an IP address for the UE 10. At step 1008, the Dynamic Host Control Protocol (DHCP) allows the UE 10 to obtain the newly assigned IP address via the TWAN node 12.

As mentioned above, some UEs, which may or may not be dual mode UEs, have a separate radio, by which it can operate as a Wi-Fi access point (e.g. a hotspot), enabling other WLAN devices (e.g. WLAN devices 22, 24, 26 of FIG. 1) to connect to the UE and employ the UE's data communications capabilities, including its cellular network connection, to access the internet and other subscribed services. Such other devices are said to be tethered to the cellular network and are known as Tethered Equipment (TE), and may comprise computers, including desktop, laptop, netbook and/or tablet computers, cellular phones, portable devices such as e-book readers, digital music and/or video players, cameras, game controllers and/or devices and other UEs.

This Wi-Fi hotspot capability may be useful when the TE does not have access to an existing visible or hidden WLAN, including a TWAN. However, to provide this hotspot capability, the UE performs data communications through both its cellular radio and its hot-spot radio, which may rapidly decrease the battery life of the UE. Additionally, the TE occupies additional cellular bandwidth of the UE, the cost of which would be borne by the UE subscriber.

These issues are compounded by the proliferation of WLAN devices. Increasingly, users have multiple devices and scenarios may be envisaged where a single (subscribing) UE tethers multiple TEs.

Where the subscribing UE is a dual mode UE and there is an available WLAN, which may be a TWAN, the possibility exists that a WLAN device, such as a TE, could access the WLAN directly. If the WLAN device does not have or is not provisioned with its own SIM or UICC containing SIM/Universal Subscriber Identity Module (USIM) credentials (ie. Hereinafter referred to as a non-subscribing wireless/WLAN device), the WLAN device may not be able to authenticate and gain access to subscribed EPC/WLAN services. To address this situation, Section 6.7 of TS 33.234, which is incorporated by reference in its entirety herein, provides a method for a (non-subscribing) WLAN device to use a subscribing UE's SIM USIM credentials, and perform EPA-SIM, AKA or AKA' authentication against the operators EPC in the context of a TWAN.

Once the authentication process has been successfully completed, a non-subscribing WLAN device can thereafter connect to the WLAN and obtain services (e.g. from the EPC), as if it were the subscribing UE. Indeed, from the perspective of the WLAN, the WLAN device is indistinguishable from the subscribing UE.

The fact that conventionally, from the perspective of the WLAN, the non-subscribing WLAN device is indistinguishable from the subscribing UE limits the capabilities that are offered by the operator to the subscribing UE and the non-subscribing WLAN device. By way of non-limiting example, four limits on capabilities are identified:

1. Traffic steering: In some example embodiments, for a dual mode UE, the operator's cellular network may in fact provide improved data bandwidth rather than the corresponding WLAN. In such circumstances, the operator network may provide a capability, whether permanently or in specific situations, or upon user preference or specification, whereby the subscribing UE is not admitted to the WLAN. Additionally, or alternatively, while the subscribing UE is connected to the WLAN, where the subscribing UE's throughput is detected as having become worse than it would have been through the cellular network, the operator network may provide a capability, whether permanently or in specific situations, or upon user preference or specification, whereby the WLAN disassociates the admitted subscribing UE. This capability is known as traffic steering and provides that the subscribing UE is attached to the better performing data network.

When a WLAN device is connected to the WLAN, if such traffic steering capability is enabled, the operator network may mistakenly assume that the non-subscribing WLAN device is the subscribing UE, because the devices share the subscribing UE's IMSI and are, to the WLAN, indistinguishable. As such, if the throughput experienced by the WLAN device is less than what the subscribing UE would have experienced through the cellular network, the operator network may attempt to disassociate the non-subscribing WLAN device. However, in some example embodiments, the non-subscribing WLAN device lacks an ability to access a cellular network, so that the non-subscribing WLAN device's data connection would be severed. In this case, it would be beneficial to identify the devices as being a non-subscribing WLAN device or a subscribing UE.

2. S2a session: In order for each device to access EPC services, it would be advantageous to differentiate the various devices. Otherwise, only the first device (whether the subscribing UE or one of the non-subscribing WLAN devices) to connect to the WLAN may access the EPC services.

3. IP mobility continuity: Because the subscribing UE and non-subscribing WLAN device are mobile devices, and may move between cells, access points, WLANs, cellular networks and/or between a WLAN and a cellular network (either manually, or automatically, such as for example, as discussed above in the context of traffic steering), it would be advantageous to maintain the IP address assigned to the device(s), in order to avoid interruption of the data communications, for example, during the course of a download of video or other content.

4. Core network connection: In some example embodiments, it would be advantageous for the network operator to enable individual policies for each device and/or to separately monitor and/or charge for EPC services.

Absent a mechanism for differentiating the subscribing UE from other devices that might use the UE's credentials to authenticate, the devices would share a common policy and the UE subscriber may not be able to obtain differentiated services for its devices and/or may not be able to obtain separate billing information.

SUMMARY

The present disclosure describes a method of allowing a WLAN node and/or a packet gateway to distinguish between a subscribing wireless device and one (or more) non-subscribing wireless device (such as a WLAN device), when either or both are connected to a WLAN using the subscribing device's subscriber information.

According to one aspect, the present disclosure provides a wireless access node configured to initiate a session with a packet gateway for a connecting device where the connecting device is one of a subscribing wireless device configured with authentication information and a non-subscribing wireless device and where the non-subscribing wireless device is configured to authenticate with the subscribing wireless device's authentication information. The access node includes one or more processors, and memory containing instructions, the instructions when executed by the one or more processors being configured to receive identification information uniquely identifying the connecting device, and based on the identification information received, send a session request message to the packet gateway to establish a session for the connecting device, the session request message including information distinguishing the connecting device from another wireless device configured to authenticate with the authentication information associated with the subscribing wireless device.

According to this aspect, in some embodiments, the connecting device is a non-subscribing wireless device and the other wireless device is a subscribing wireless device. In some other embodiments, the subscribing wireless device is configured for operation with a Subscriber Identity Module (SIM) containing the authentication information and the non-subscribing wireless device is configured for operation without a SIM. In yet some other embodiments, the instructions are further configured to receive an authentication confirmation containing at least one of a subscriber identity associated with the subscribing wireless device SIM and an APN and to send the session request message in response to the authentication confirmation received. In yet some other embodiments, the instructions are further configured to receive the authentication confirmation from one of an Authentication Authorization and Accounting (AAA) server, a Home Subscriber Server (HSS) and a Home Location Register HLR Server. In yet some other embodiments, the subscribing wireless device is a User Equipment (UE) and the non-subscribing wireless device is a Tethered Equipment (TE).

In some other embodiments, the distinguishing information distinguishes the session for the connecting device from an existing session for the other wireless device. In yet some other embodiments, the session for the connecting device and the existing session for the other wireless device are S2a sessions. In yet some other embodiments, the distinguishing information includes at least one of a bearer identity, an Access Point Name (APN) and the identification information. In yet some other embodiments, the at least one of a bearer identity, APN and the identification information is different from at least one of a bearer identity, an APN and identification information associated with an existing session for the other wireless device. In yet some other embodiments, the distinguishing information enables a determination of whether to provide a service to the connecting device based on the identification information.

In some other embodiments, the service is a subscription service includes one of a billing service, a policy service and an internet service, a Voice-over-Internet Protocol (VoIP) service. In yet some other embodiments, the instructions are further configured to receive the identification information in response to a request sent by the wireless access node to the connecting device. In yet some other embodiments, the identification information includes one of a hardware identifier and a Medium Access Control (MAC) address of the connecting device. In yet some other embodiments, the identification information further comprises a Boolean parameter identifying the connecting device as one of a subscribing device and a non-subscribing device.

According to another aspect, the present disclosure provides a method for a wireless access node for initiating a session with a packet gateway for a connecting device where the connecting device is one of a subscribing wireless device configured with authentication information and a non-subscribing wireless device, and where the non-subscribing wireless device is configured to authenticate with the subscribing wireless device's authentication information. According to this aspect, the method includes receiving identification information uniquely identifying the connecting device, and based on the identification information received, sending a session request message to the packet gateway to establish a session for the connecting device, the session request message including information distinguishing the connecting device from another wireless device configured to authenticate with the authentication information associated with the subscribing wireless device.

In this aspect, in some embodiments, the connecting device is a non-subscribing wireless device and the other wireless device is a subscribing wireless device. In some other embodiments, the subscribing wireless device is configured for operation with a Subscriber Identity Module (SIM) containing the authentication information and the non-subscribing wireless device is configured for operation without a SIM. In yet some other embodiments, the method further includes receiving an authentication confirmation containing at least one of a subscriber identity associated with the subscribing wireless device SIM and an APN and sending the session request message in response to the authentication confirmation received. In yet some other embodiments, the receiving includes receiving the authentication confirmation from one of an Authentication Authorization and Accounting (AAA) server, a Home Subscriber Server (HSS) and a Home Location Register HLR Server. In yet some other embodiments, the subscribing wireless device is a User Equipment (UE) and the non-subscribing wireless device is a Tethered Equipment (TE). In yet some other embodiments, the distinguishing information distinguishes the session for the connecting device from an existing session for the other wireless device. In yet some other embodiments, the session for the connecting device and the existing session for the other wireless device are S2a sessions.

In some other embodiments, the distinguishing information comprises at least one of a bearer identity, an Access Point Name (APN) and the identification information. In yet some other embodiments, the at least one of a bearer identity, APN and the identification information is different from at least one of a bearer identity, an APN and identification information associated with an existing session for the other wireless device. In yet some other embodiments, the distinguishing information enables a determination of whether to provide a service to the connecting device based on the identification information.

In other embodiments, the service is a subscription service comprising one of a billing service, a policy service and an internet service, a Voice-over-Internet Protocol (VoIP) service. In yet some other embodiments, the receiving includes receiving the identification information in response to a request sent by the wireless access node to the connecting device. In yet some other embodiments, the identification information comprises one of a hardware identifier and a Medium Access Control (MAC) address of the connecting device. In yet some other embodiments, the identification information further comprises a Boolean parameter identifying the connecting device as one of a subscribing device and a non-subscribing device.

BRIEF DESCRIPTION OF THE DRAWINGS

Example embodiments of the present disclosure will now be described by reference to the following figures, in which identical reference numbers in different figures indicate identical elements, and in which:

FIG. 7 is a block diagram of an exemplary embodiment of the WLAN access node of FIG. 3 constructed in accordance with the principles of the present disclosure;

FIG. 8 is a block diagram of an exemplary embodiment of a subscribing UE constructed in accordance with the principles of the present disclosure; and FIG. 9 is a block diagram of an exemplary embodiment of a non-subscribing WLAN device constructed in accordance with the principles of the present disclosure.

DETAILED DESCRIPTION

Figure 1:
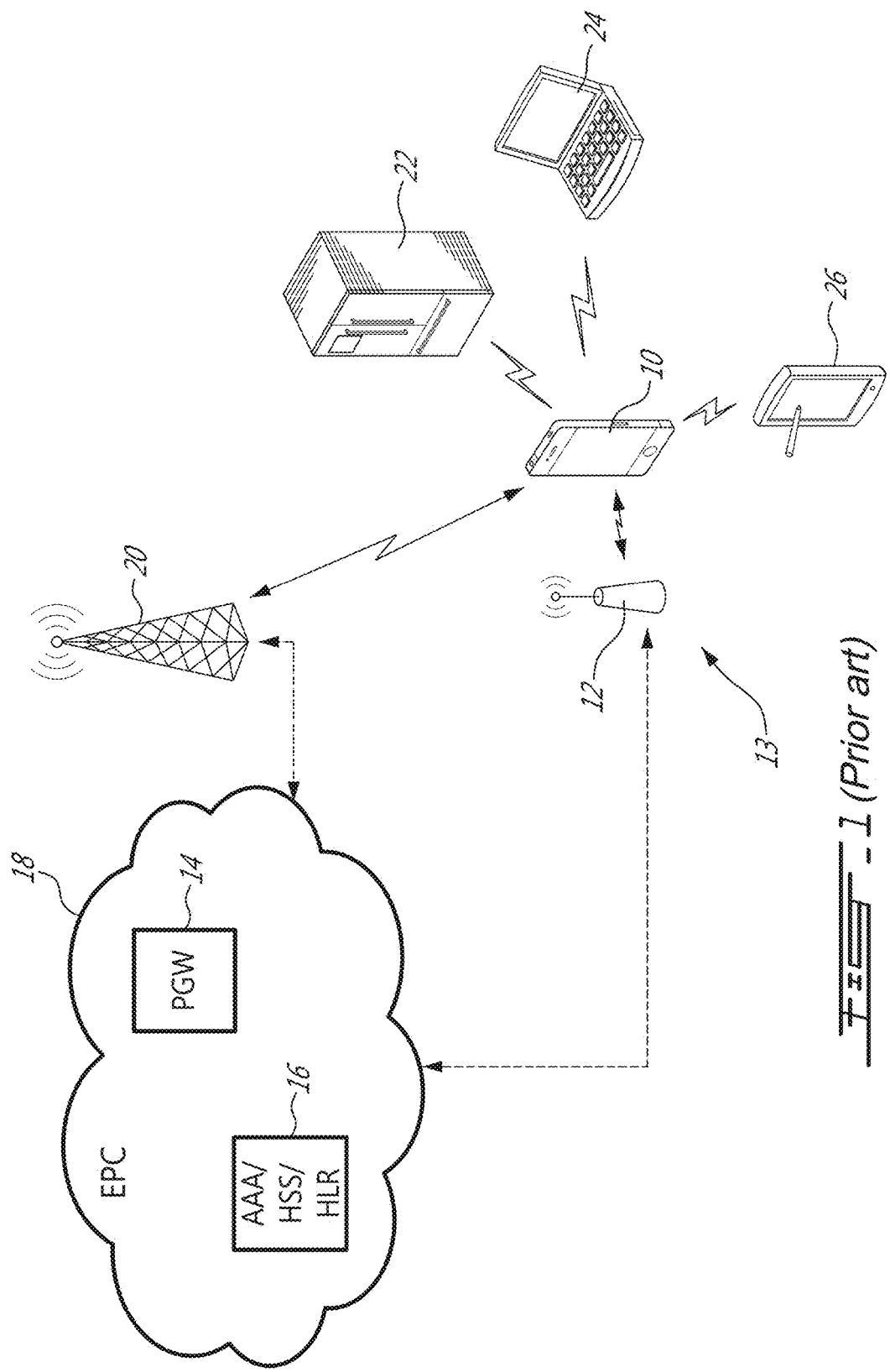
FIG. 1 shows a Radio Access Network (RAN) in which a subscribing UE and non-subscribing Wireless Local Access Network (TWAN) devices can operate with and obtain services from a Evolved Packet Core (EPC) network via a WLAN.
Figure 2:
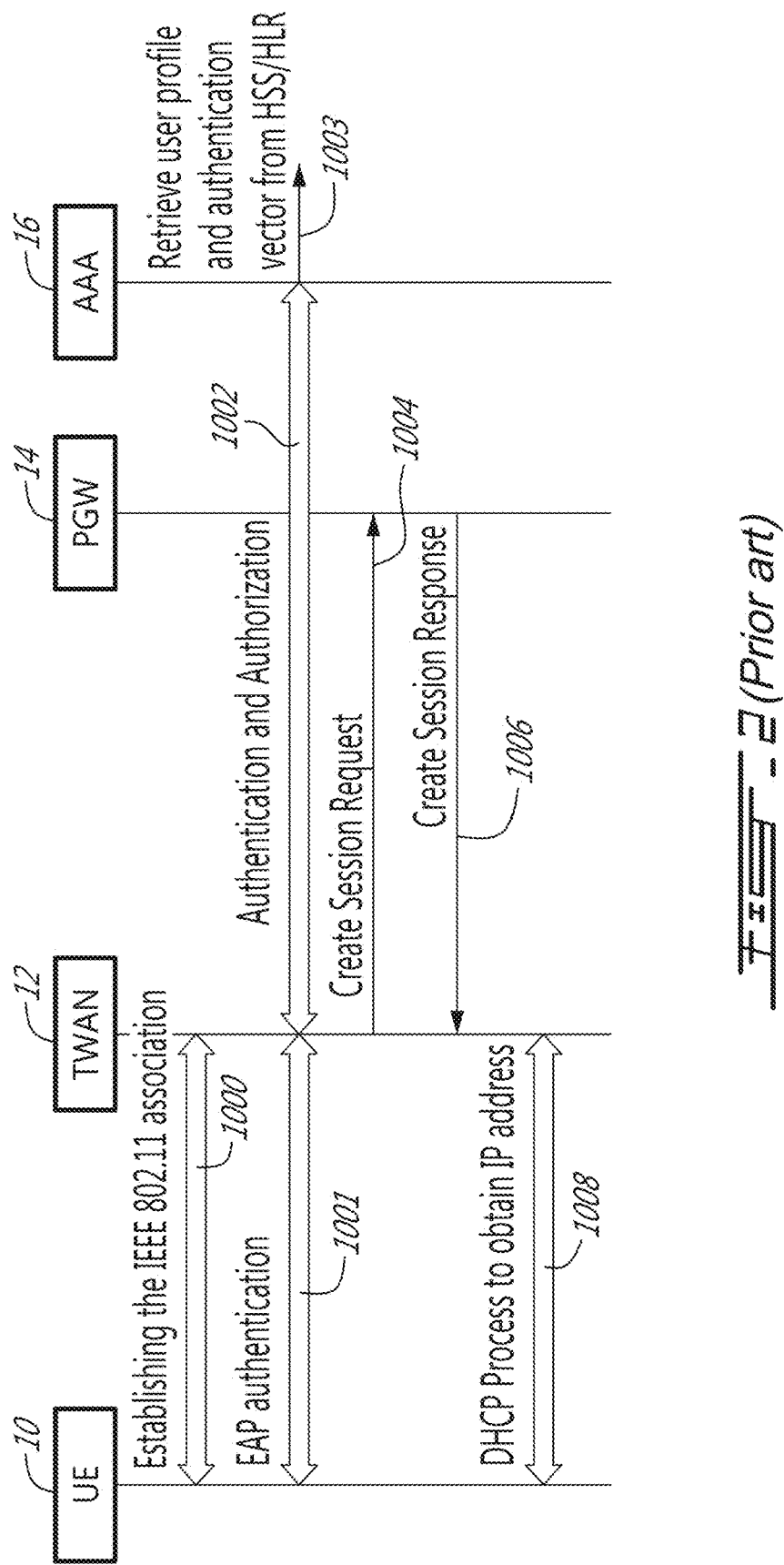
FIG. 2 is a signaling diagram demonstrating an example method of establishing an S2a session between the TWAN and the EPC for the subscribing UE of FIG. 1.

The present disclosure describes a method and system of enabling a WLAN node and/or a packet gateway to distinguish between a subscribing wireless device and one (or more) non-subscribing wireless device (such as a WLAN device), when either or both are connected to a WLAN using the subscribing device's subscriber information.

The description that follows relates to Wireless Local Area Networks generally and in specific examples, assumes TWAN access. However, those having ordinary skill in the relevant art will readily appreciate that a similar implementation of many aspects using untrusted WLANs can be achieved. In addition, the present disclosure can also be applied to other types of short range access networks. Examples include Bluetooth networks, infrared networks, Wireless Personal Area Networks (WPANs), Wireless Metropolitan Area Networks (WMAN), $3^{rd}$ Generation Partnership Project 3GPP networks that operate over unlicensed spectrum (e.g. Long Term Evolution Unlicensed (LTE-U)), etc. More generally, the present disclosure also applies to any access network in which non-subscribing wireless devices (further details below) may connect into to gain access to an operator's core network and services. For clarify and as used herein, the term WLAN is intended to cover all of these possibilities.

Further, although General Packet Radio Service (GPRS) Tunnel Protocol (GTP) S2a sessions are discussed herein, the embodiments described herein also apply to other types of sessions such as for example, Proxy Mobile Internet Protocol (PMIP) S2a sessions. More generally, the present disclosure also applies to any type of session for a connecting device that connects a wireless access point or node to an operator's core network.

In addition, although the examples described therein refer to a Long Term Evolution (LTE) Radio Access Network (RAN) and Core Network (e.g. Evolved Packet Core (EPC), it is understood that the present disclosure is not limited as such and can equally be used in other networks, including other $3^{rd}$ Generation Partnership Project (3GPP) networks such as a Universal Mobile Telecommunications System UMTS, LTE-Advanced (LTE-A), future networks (e.g. 5G.

The following examples refer to a subscribing device as a UE configured with its own Subscribing Identification Module (SIM) authentication or subscriber credentials to authenticate via a RAN and gain access to an operator core network services. It is to be understood that alternatives are possible and intended to be within the scope of the present disclosure. For example, the authentication information could be stored on a Universal Integrated Circuit Card (UICC), a so-called soft SIM or a virtual SIM. Alternatively, the SIM could be a module integrally formed in a memory of the subscribing UE and the subscriber's authentication information (ie. SIM credentials) could be stored/downloaded by an operator directly in the subscribing UE's memory (e.g. Random Access Memory) without the need for a separate card or module. Other types of SIM or smart card configurations to store subscriber and/or authentication information are also possible. For clarity and brevity, the term SIM will hereinafter be used and is intended to cover the different possibilities for storing a subscriber's authentication information in a subscribing UE to connect to a cellular network.

Figure 3:
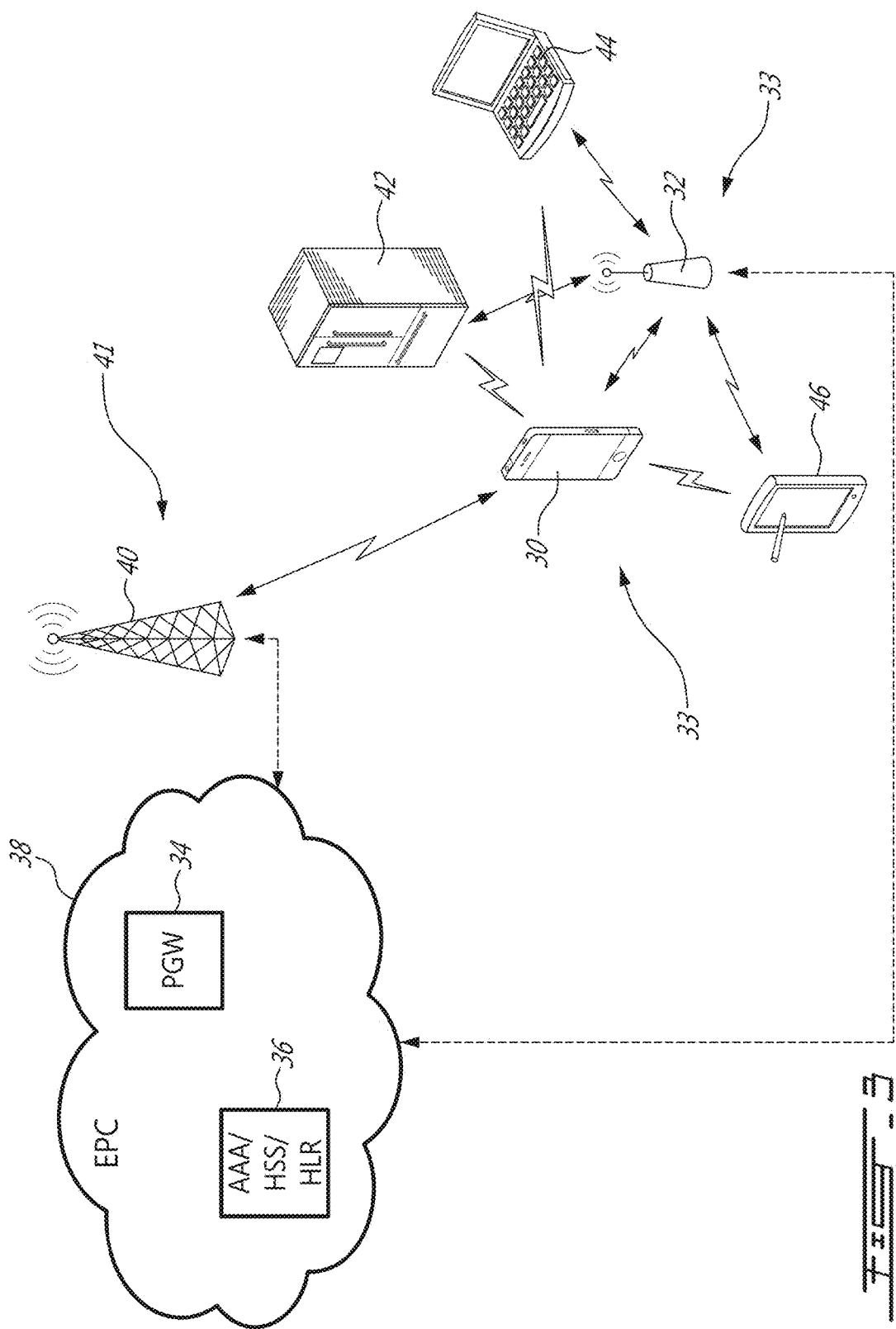
FIG. 3 shows a RAN in which a subscribing UE device and non-subscribing WLAN devices can operate with and obtain services from an EPC network via a WLAN access node according to one example embodiment of the present disclosure.

Referring now to FIG. 3, there is shown a Radio Access Network (RAN) node 40 (e.g. an eNodeB in the case of LTE) of a RAN 41 in which a subscribing UE 30 (a connecting device) can operate with and obtain services from an operator's core network or EPC 38. In addition to accessing the RAN 41 via the RAN node 40, the subscribing UE 30 is configured to access the EPC 38 via a WLAN access node 32 in a WLAN 33, which may be a TWAN. In this example, the subscribing UE 30 is a wireless device equipped (or configured to operate) with its own SIM containing SIM credentials. When provisioned with a SIM, the UE 30 uses the SIM credentials to authenticate with the EPC 38 either via the RAN node 40 or the WLAN node 32. Although the UE 30 is shown as a wireless device separate from other devices in the WLAN 33 and RAN 41, the present disclosure is not limited as such. For example, the functionality described herein as being performed by the UE 30 may in some examples be incorporated into the WLAN access node 32 or some other node or device of the WLAN 33 or the RAN 41. More generally, the functionality of the UE 30 may be implemented in any node of the WLAN 33 or RAN 41 configured to authenticate as herein described with its own SIM credentials and configured to communicate with other devices in the WLAN 33. Other implementations are possible.

Non-subscribing WLAN devices 42, 44, 46 are wireless devices that are not equipped (not configured) with their own SIM and instead, use credentials of a subscribing UE (e.g. UE 30 in FIG. 3) to authenticate with the EPC 38 via the WLAN node 32. Such devices may include computers, including desktop, laptop, netbook and/or tablet computers, cellular phones, portable devices such as e-book readers, watches, digital music and/or video players, cameras, game controllers and/or devices and other UEs but also may also include computing-like devices such as hart monitoring implants, biochip transponders, automobiles, sensors, thermostats, and/or other home or car appliances generally referred to as Internet of Things (IoT) devices.

The WLAN devices 42, 44, 46 may also be said to be tethered to the RAN 40 and may be known as Tethered Equipment (TE), such as for example when they connect to the UE 30 and employ the UE's data communications capabilities, including its cellular network connection, to access core network services.

In the example shown in FIG. 3, the RAN 41 is an LTE RAN, and the core network 38 is an EPC network. The EPC 38 includes a Packet Data Network (PDN) Gateway (PGW) 34 and an Authentication, Authorization and Accounting (AAA) Server (or Proxy) 36 which itself can connect with network resources of a home operator (e.g. Home Location Register/Home Subscriber Server (HSS)) to perform AAA procedures for the UE 30. In this example, the UE 30 is a dual-mode device that is also configured to operate with the EPC 38 via the RAN 41 (and thus via the RAN node 40) but also via the WLAN 33 (ie via the WLAN access node 32).

The UE 30 also has a separate radio, by which it can communicate with the WLAN devices 42, 44, 46 to provide authentication information and/or to complete the authentication procedure during authentication of the WLAN devices 42, 44, 46 (to be described in further details below). Depending on the communication capabilities of the UE 30 and the WLAN devices 42, 44, 46, there are many ways in which they could communicate. One example is via a hot-spot capability via their respective WLAN radios. Assuming the UE 30 and WLAN devices are equipped with the proper radios, other examples include via a radio network such as a WLAN (e.g. the WLAN 33), a WPAN, a WMAN, or other short range wireless networks such as an LTE-Unlicensed (LTE-U) network. Other examples include wireless direct communication technologies such as Wi-Fi Direct, Bluetooth, infrared or cellular-based direct communication technologies such as Device-to-Device (D2D) communications (e.g. LTE D2D) but also as well as via a wired connection (e.g. Universal Serial Bus (USB)).

In order to operate with the EPC 38 via the RAN 41, the UE 30 (a connecting device) is configured to use authentication information stored on its SIM and to perform Extensible Authentication Protocol (EAP) authentication (including, without limitation, EAP-SIM. EAP-AKA, or EAP-AKA' protocols) against the operator's AAA Server 36. If operation on the WLAN 33 is preferred or configured, the UE 30 can also follow a similar authentication procedure and authenticate via the WLAN node 32. As mentioned above, an example of such procedure is described in section 6.1 of 3GPP TS 33.234, V11.4.0, 2012-06: "Wireless Local Area Network (WLAN) interworking security" (TS 33.234), which is incorporated by reference herein in its entirety.

With successful authentication via the WLAN 33, the UE 30 is authorized to use its assigned IMSI and/or other authentication credentials to gain access to the operator's EPC 38 using WLAN access to obtain various EPC services such as billing, policy enforcement, and other subscribed services (e.g. Internet, VoIP, etc.) or to receive services offered by the operator at the WLAN node 32 (or WLAN 33) such as an S2a service, a Non-seamless WLAN Offload (NSWO) service and/or some other mobility service, as instructed by the AAA server 36.

As noted above, in the example of FIG. 3, the WLAN devices 42, 44, 46 do not have their own SIM credentials. In order to authenticate like the UE 30, the WLAN devices 42, 44, 46 as connecting devices use the UE 30 SIM credentials to authenticate via the WLAN 33. Section 6.7 of TS 33.234, which is incorporated by reference in its entirety herein, provides a method for a WLAN device to use a subscribing UE's SIM credentials, and perform EPA-SIM, AKA or AKA' authentication against the operator's EPC in the context of a TWAN.

Figure 4:
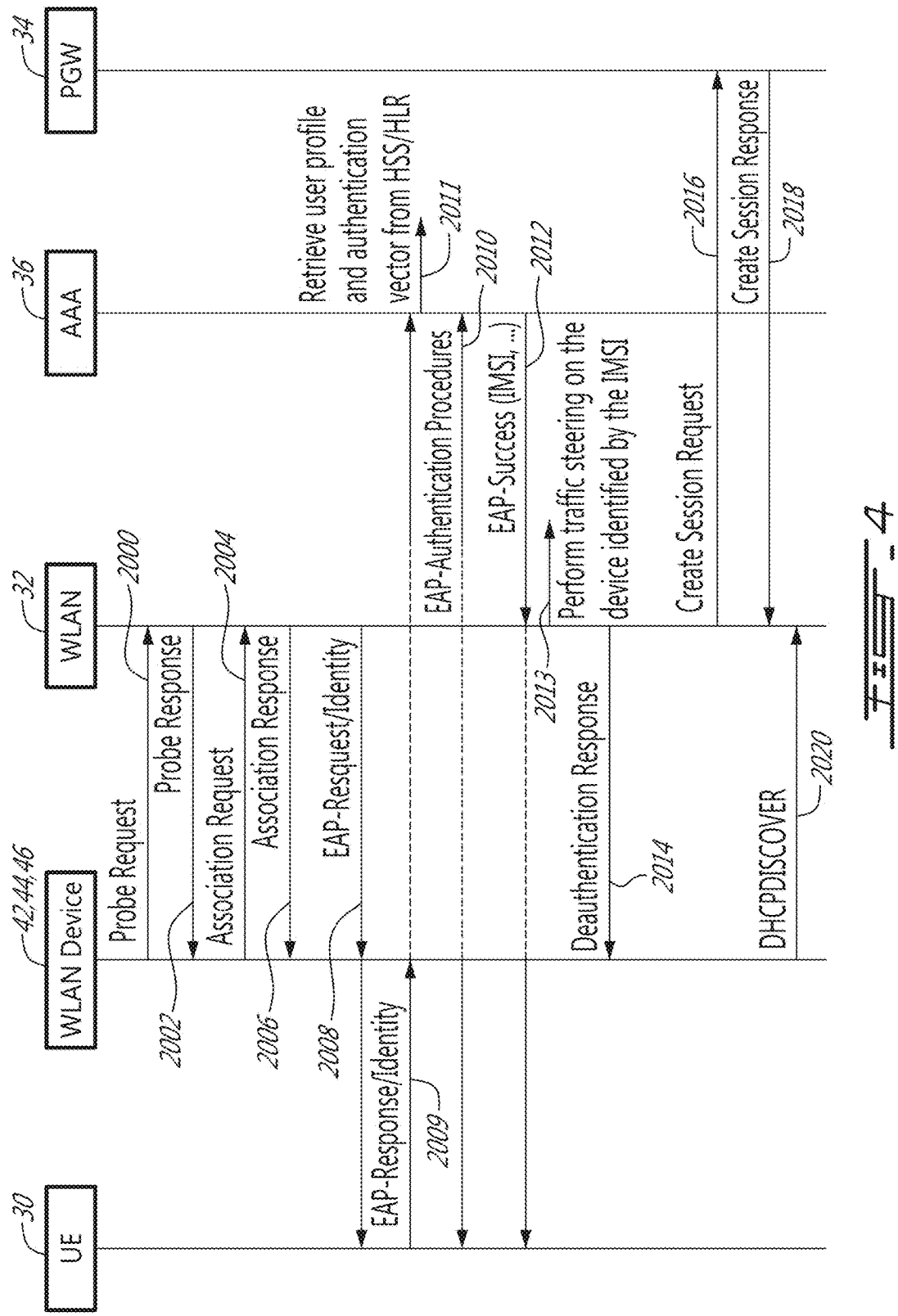
FIG. 4 is a signaling diagram demonstrating an example method of a non-subscribing WLAN device of FIG. 3 sending identification information to the WLAN node for the establishment of an S2a session with the EPC network according to one example embodiment of the present disclosure.

Turning now to FIG. 4, there is shown a signaling diagram demonstrating an example method of a connecting device, in this case a non-subscribing WLAN device (e.g. WLAN devices 42, 44, 46 of FIG. 3) sending identification information to the WLAN node 32 for the establishment of an S2a session with the PGW 34 of the EPC 38 and/or to receive other services offered by the operator at the WLAN node 32 (or WLAN 33) such as NSWO service or some other mobility service. As is conventional, when the WLAN device 42, 44, 46, wishes to connect to the WLAN 33, the non-subscribing WLAN device 42, 44, 46 discovers WLANs within its radio range through passively monitoring IEEE 802.11 Beacon frames or through actively sending IEEE 802.11 Probe Requests (step 2000) to a specific WLAN node 32 associated with a specific SSID. The WLAN node that receives the request and matches the criteria (in this non-limiting example, the WLAN node 32), will respond with an IEEE 802.11 Probe Response, as shown at step 2002 and described in FIG. 4-17 of IEEE 802.11-2012: "IEEE Standard for Information technology—Telecommunications and information exchange between systems—Local and metropolitan area networks—Specific requirements—Part 11: Wireless LAN Medium Access Control (MAC) and Physical Layer (PHY) specifications" (IEEE 802.11-2012), which is incorporated by reference in its entirety herein.

The WLAN device 42, 44, 46 sends an IEEE 802.11 Associate Request message at step 2004 to request an association to the WLAN node 32. At step 2006, the WLAN node 32 sends an IEEE 802.11 Association Response message to grant the association.

Before the WLAN device 42, 44, 46 obtains a network-assigned IP address, it undergoes authentication. In this example, the WLAN node 32 initiates EAP authentication as Authenticator by sending an EAP-Request/Identity message at step 2008 to the WLAN device 42, 44, 46. As the (non-subscribing) WLAN device 42, 44, 46 uses the SIM credentials of the subscribing UE 30 during the EAP authentication process, it relays (forwards) the message to the subscribing UE 30. The subscribing UE 30 is the true supplicant and responds with its identity via the EAP-Response/Identity message at step 2009 that is relayed via the WLAN device 42, 44, 46 to the AAA server 36 as the Authentication Server.

The entire EAP authentication is performed between the subscribing UE 30 and the AAA server 36 (in communication with the HSS/HLR (not shown)), in a manner that is transparent to the WLAN device 42, 44, 46 and the WLAN node 32. The messages relevant to the present disclosure are shown in FIG. 4 and for brevity and clarity, the rest of the procedure is shown at step 2010 but is understood to possibly include many more/different steps before, during and/or after the specific steps shown in FIG. 4. Further details of the authentication process shown in FIG. 4 may be found in FIG. 4 of section 6.1.1.1 of TS 33.234, which is incorporated by reference in its entirety herein.

The WLAN device 42, 44, 46 relays or forwards all messages using procedures described in section 6.7 of TS 33.234, which is incorporated by reference in its entirety herein. In some example embodiments, the procedure may be as described in FIG. 11 of section 6.7.1.1 of TS 33.234, which is incorporated by reference in its entirety herein. The Extended Authentication Protocol Over LAN (EAPoL) protocol described in IEEE 802.1 X-2010: "IEEE Standard for Local and metropolitan area networks—Port-Based Network Access Control" (802.1X-2010), which is incorporated by reference in its entirety herein, may be used in some example embodiments to transparently carry the EAP messages between the WLAN device 42, 44, 46 and the WLAN node 32.

Once the EAP authentication is successful, the AAA server 36 sends an EAP-Success message at step 2012 that includes the authorized IMSI (corresponding to the subscribing UE 30) and optionally other authentication elements or information to the WLAN node 32, which, for example, may include a default or unique APN (further details below). The EAP-Success message at step 2012 may be sent using the Diameter protocol described in TS 29.273 or the RADIUS protocol described in RFC 3579 in some example embodiments.

According to an example embodiment, the WLAN node 32 identifies the WLAN device 42, 44, 46 using identification information that uniquely identifies the WLAN device 42, 44, 46. In one example, the identification information includes a hardware identifier for the WLAN device 42, 44, 46 such as a Medium Access Control (MAC) address and/or a Boolean parameter. From the Boolean parameter, the WLAN node 32 recognizes that the WLAN device 42, 44, 46 is a non-subscribing WLAN device as opposed to a subscribing UE, and may, on that basis, not invoke certain features or services that do not apply to non-subscribing devices. An example of such feature/service is traffic steering. In the example shown in FIG. 4, the WLAN node 32 may determine not invoke traffic steering (e.g. step 2013), as the WLAN device 42, 44, 46 is a non-subscribing device (e.g. not able to connect to the RAN 40. However, if the WLAN device were a subscribing device (e.g. UE 30), the WLAN node 32 might invoke traffic steering (step 2013) and, where appropriate, force the subscribing device to access the EPC 38 via the RAN 40 (FIG. 3) by, for example, sending a De-Authentication Response at step 2014.

Once the authentication process is complete and successful, the WLAN node 32 sends a Create Session Request message at step 2016 to the PGW 34 to establish an S2a session with the PGW 34 for the WLAN device 42, 44, 46. The message contains the IMSI previously authorized during the authentication process (e.g. the IMSI associated with the UE 30) and the APN provided by the AAA server 36, as well as other parameters necessary to establish the S2a session such as, for example, an Evolved Packet System (EPS) Bearer Identity (e.g. EPS-ID-X) and a default EPS Bearer Quality of Service (QoS). In some embodiments, the EPS Bearer Identity and default EPS Bearer QoS parameters convey a default S2a bearer Quality of Service (QoS). In response, at step 2018, the PGW 34 returns a Create Session Response message to the WLAN node 32. At that point, the WLAN device 42, 44, 46 sends a Dynamic Host Communication Protocol (DHCP) Discover message at step 2020 to the WLAN node 32 to request an IP address. Once the WLAN device 42, 44, 46 obtains the IP address, it is able to receive user-subscribed services from the EPC 38 (FIG. 3). In some embodiments, instead of or in addition to establishing a session for the WLAN device 42, 44, 46, the WLAN node 32 may, based on the identification information received, provide other services such as an NSWO service and/or some other mobility service.

Self-Identification of Non-Subscribing WLAN Device

In some example embodiments, the non-subscribing WLAN device (e.g. WLAN device 42, 44, 46) provides the identification information to the WLAN node 32 so that the WLAN node 32 can recognize it as a non-subscribing device. In some example embodiments, some or all of the identification information or different identification information is sent to the PGW 34 to enable the PGW 34 to uniquely identify the device.

When the WLAN device 42, 44, 46 attempts to access the WLAN node 32 following the authentication procedure described above and using the same IMSI as that of the subscribing UE 30, in the context of a TWAN, the WLAN node 32 receives the authorized IMSI (of the subscribing UE 30) and a default or unique APN from the AAA server 36 (further details below).

However, in some example embodiments, the non-subscribing WLAN device 42, 44, 46 identifies itself as such to the WLAN node 32 by providing a Boolean parameter, which in some example embodiments may be referred to as a TEIdentifier parameter, to the WLAN node 32. In some example embodiments, the parameter may be set to True by the WLAN device 42, 44, 46 to identify itself as a non-subscribing WLAN device and may be defaulted and/or set to False (if sent by the subscribing UE 30 during a connection attempt) to identify that it is not a non-subscribing WLAN device but a subscribing UE. In some example embodiments, the parameter may be set to False by the WLAN device 42, 44, 46 to identify itself as a non-subscribing WLAN device and may be defaulted to True (if sent by the subscribing UE 30 during a connection attempt) to identify that it is not a non-subscribing WLAN device but a subscribing UE.

It should be noted that the Boolean parameter differentiates or distinguishes between a non-subscribing WLAN device, that is, a device that is using another device's IMSI and other authentication information stored on the other device's SIM to authenticate, and a subscribing WLAN device, that is, a device that is using its own IMSI and other authentication information to authenticate. It is conceivable that a dual-mode UE would for some reason tether to a subscribing UE (for example if the dual-mode UE is not a subscriber to an operator network). In this case, when the dual-mode UE attempts to connect to the WLAN node 32, it would be considered a non-subscribing WLAN device and would set the Boolean parameter to True, even though it is a UE, since it is not a subscribing UE and not using its own IMSI.

In addition or as an alternative to a Boolean parameter, the WLAN device 42, 44, 46 can send as identification information a hardware identifier to uniquely identify the WLAN device 42, 44, 46. The hardware identifier may in some examples be a MAC address of the WLAN device 42, 44, 46. The Boolean parameter and/or the hardware identifier is to permit differentiation of different devices at the WLAN node 32 but also at the PGW 34 as will be described below in further details.

The identification information (e.g. the Boolean parameter and/or the hardware identifier) can be sent by the WLAN device 42, 44, 46 is a variety of ways. In some example embodiments, the WLAN device 42, 44, 46 sends the identification information prior to or during the authentication procedure, especially in order to provide the WLAN node 32 (or WLAN 33) with a mechanism to disable a traffic steering policy in respect of the WLAN device 42, 44, 46, if applicable. In the example shown in FIG. 4, the WLAN device 42, 44, 46 could send the identification information in an IEEE 802.11 Probe Request (step 2000) or Association Request (2004) message, each of which are followed by a corresponding response from the WLAN node 32.

WLAN Identification of Non-Subscribing WLAN Device

In some example embodiments, and as an alternative to the WLAN device 42, 44, 46 self-identifying, the WLAN node 32 can request the identification information from the WLAN device 42, 44, 46. In that scenario, and in one example, the WLAN request the WLAN device 42, 44, 46 to identify whether it is a non-subscribing WLAN device by sending the Boolean parameter set to False, as part of the IEEE 802.11 Probe Response message to the WLAN device 42, 44, 46. Upon receiving the Probe Response message with the Boolean parameter set to False, the WLAN device 42, 44, 46 sets the Boolean parameter according to whether it was a non-subscribing WLAN device (set to True) or a subscribing UE (set to False) and sends it as part of the Association Request message (step 2004). In some example embodiments, if the WLAN device 42, 44, 46 uses its own SIM credentials for EAP authentication, it does not use the Boolean parameter.

In some example embodiments, the WLAN node 32 would only request the WLAN device 42, 44, 46 to identify whether it is a non-subscribing WLAN device, if it is configured to provide traffic steering.

Operator Network Identification of Non-Subscribing WLAN Device

In some example embodiments, the operator network (e.g. the EPC 38) stores identification information for a device, which enables the WLAN node 32 to differentiate between a non-subscribing WLAN device and a subscribing UE. In a specific example, the AAA server 36 stores a hardware identifier (e.g. MAC address) for the WLAN device 42, 44, 46 and/or a Boolean parameter such as those described above. This identification information could be obtained by the AAA server 36 by various means. In one example, the AAA server 36 retrieves the identification information from an HSS/HLR that maintains the information for all wireless devices associated with a particular subscription account or subscriber. Alternatively, the identification information could be obtained directly from the WLAN device 42, 44, 46 (instead of sending it to the WLAN node 32) during before, during or after the authentication procedure, using either specific (new) messages or existing messages used to complete the authentication procedure with the AAA server 36.

Other approaches for the AAA server 36 to obtain the identification information are possible. Thereafter, upon successful authentication, the AAA server 36 sends the identification information (e.g. the Boolean parameter and/or the hardware identifier) to the WLAN node 32.

In order to convey the WLAN device identification information to the WLAN node 32, the Diameter AAA protocol described in 3GPP TS 29.273, V11.7.0, 2013-09: "3GPP EPS AAA interface" (TS 29.273), which is incorporated by reference in its entirety herein is an example of a protocol that can be used. In such a protocol, the identification information (e.g. the Boolean parameter and/or the hardware identifier) could be carried by the Diameter-EAP Answer/EAP-Success message (step 2012 in FIG. 4). Alternatively, in some other example embodiments, the Remote Authentication Dial In User Service (RADIUS) could be used between the AAA 36 and the WLAN node 32, as described in IETF RFC 3579, September 2003: "RADIUS (Remote Authentication Dial In User Service) Support for Extensible Authentication Protocol (EAP)" (RFC 3579), which is incorporated by reference in its entirety herein. In such a protocol, the identification information could be carried by the RADIUS Access-Accept/EAP-Success message (step 2012 in FIG. 4).

On the basis of the identification information received and in accordance with an embodiment of the present disclosure, the WLAN node 32 can convey to the PGW 34 information distinguishing the WLAN device 42, 44, 46 from other devices to enable the PGW 34 to distinguish the various devices that are configured to authenticate with the SIM credentials of the subscribing UE 30 to the PGW 34. In the example shown in FIG. 4, the WLAN node 32 includes the distinguishing information in the form of attributes or information elements in the Create Session Request message sent to the PGW 34 to establish an S2a session (step 2016). However, other, different messages could be used.

The distinguishing information may take several forms and may include one or more attributes. In some examples, a first attribute corresponding to the Boolean parameter received from the WLAN device 42, 44, 46 identifies to the PGW 34 that the connecting device is a non-subscribing WLAN device. In some example embodiments, the attribute may be set to the same value as the Boolean parameter value received from WLAN device 42, 44, 46. Specifically, in some example embodiments, the Boolean parameter in the distinguishing information may be set to True when the WLAN device 42, 44, 46 is a non-subscribing WLAN device and may be defaulted and/or set to False or omitted to identify that the connecting device is a subscribing UE (e.g. UE 30).

In another example, the distinguishing information may include a second attribute corresponding to the hardware address of the WLAN device 42, 44, 46 received from the WLAN device 42, 44, 46. In some example embodiments, the hardware address may be the same as the hardware address received from WLAN device 42, 44, 46.

In some example embodiments, the Create Session Request message contains the two attributes only when the session concerns a non-subscribing WLAN device. Thus, a Create Session Request message without the second attribute signifies that the session concerns a subscribing UE. Other permutations/combinations of the Boolean and hardware address attributes are possible.

The distinguishing information may also take other forms. For example, in one embodiment, each time when the WLAN node 32 sends a Create Session Request message to the PGW 34 to establish a new S2a session (step 2016), a different EPS Bearer Identity (such as EPS-ID-y) is used. This different EPS Bearer Identity permits the PGW 34 to distinguish the wireless device from other devices (e.g. the subscribing UE 30 or other WLAN devices 42, 44, 46) that may have previously authenticated using the same SIM credentials. When a new S2a session is being set up, the PGW 34 will not override existing or future S2a sessions, if any, for previously connected or to be connected device(s).

The distinguishing information may also be in the form of different APNs to distinguish different devices. As mentioned above, during the authentication procedure, the WLAN conventionally receives the IMSI and a default APN of the subscribing UE 30. According to an embodiment of the present disclosure however, the AAA 36 sends the authorized IMSI but a different default APN to the WLAN node 32 when it detects that the IMSI being used for the authorization has been previously used. Thereafter, when the WLAN node 32 sends a Create Session Request message to the PGW 34 to establish an S2a session (step 2016), the different default APN is used. This new default APN permits the PGW 34 to distinguish the non-subscribing WLAN device 42, 44, 46 from other devices (e.g. the subscribing UE 30 or other WLAN devices 42, 44, 46) that may have previously authenticated using the same SIM credentials. When a new S2a session is being set up, the PGW 34 will not override existing or future S2a sessions, if any, for previously connected or to be connected device(s).

It is contemplated in the future that WLAN node 32 will support single connection or multi connection modes as described in section 16 of TS 23.402, which is incorporated by reference in its entirety herewith. In such case, in some example embodiments, the WLAN device 42, 44, 46 could provide a unique APN to the WLAN node 32 using these modes that uniquely identifies the WLAN device 42, 44, 46. Thereafter, when the WLAN node 32 sends a Create Session Request message to the PGW 34 to establish an S2a session (step 2016), a unique APN corresponding to the unique APN received from the WLAN device 42, 44, 46 is used. This unique APN permits the PGW 34 to distinguish the non-subscribing WLAN device 42, 44, 46 from other devices (e.g. the subscribing UE 30 or other WLAN devices 42, 44, 46) that may have previously authenticated using the same SIM credentials. When a new S2a session is being set up, the PGW 34 will not override existing or future S2a sessions, if any, for previously connected or to be connected device(s).

Figure 5:
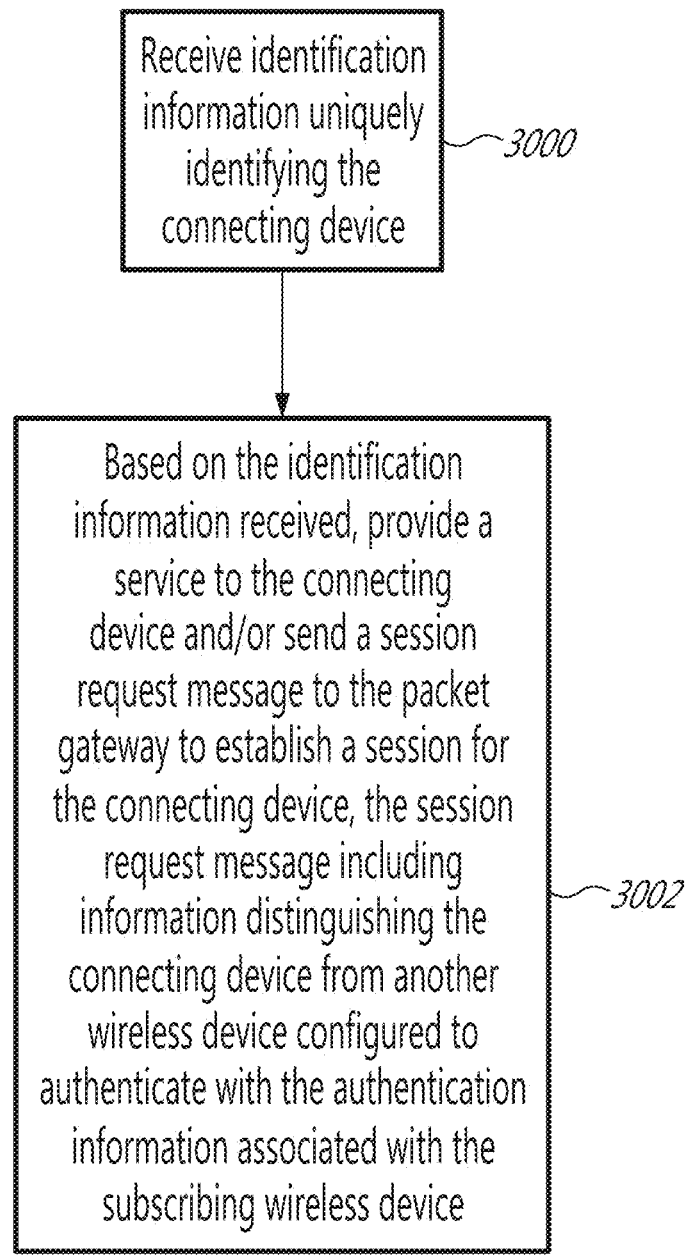
FIG. 5 illustrates a process for a WLAN node to initiate a session with a packet gateway for a connecting device according to one example embodiment of the present disclosure.

Turning now to FIG. 5, there is illustrated a process for the WLAN node of FIG. 3 to initiate a session with the PGW 34 for a connecting device such as either a subscribing wireless device (e.g. UE 30) or a non-subscribing WLAN device 42, 44, 46 according to one example embodiment of the present disclosure. At step 3000, the process begins with the WLAN node 32 receiving identification uniquely identifying the connecting device. In one example, the identification information is a hardware identifier such as a MAC address and/or a Boolean parameter. The WLAN node 32 may receive the identification information from the connecting device in an unsolicited manner (e.g. as a self-identification) or as a result of a specific request. Other alternatives are possible, including receiving the information from the AAA server 36 or some other network operator node where the identification information for connecting devices might be maintained.

At step 3002, based on the identification information received, the WLAN node 32 sends a session request message to the packet gateway to establish a session for the connecting device, the session request message including information distinguishing the connecting device from another wireless device configured to authenticate with the authentication information associate with the subscribing device. In one embodiment, the distinguishing information in the session request may include one or more of a bearer ID, and APN, and the identification information received. As noted previously, in some embodiments, instead of or in addition to establishing a session for the connecting device, the WLAN node 32 may, based on the identification information received, provide other services at the WLAN node 32 such as an NSWO service and/or some other mobility service.

Figure 6:
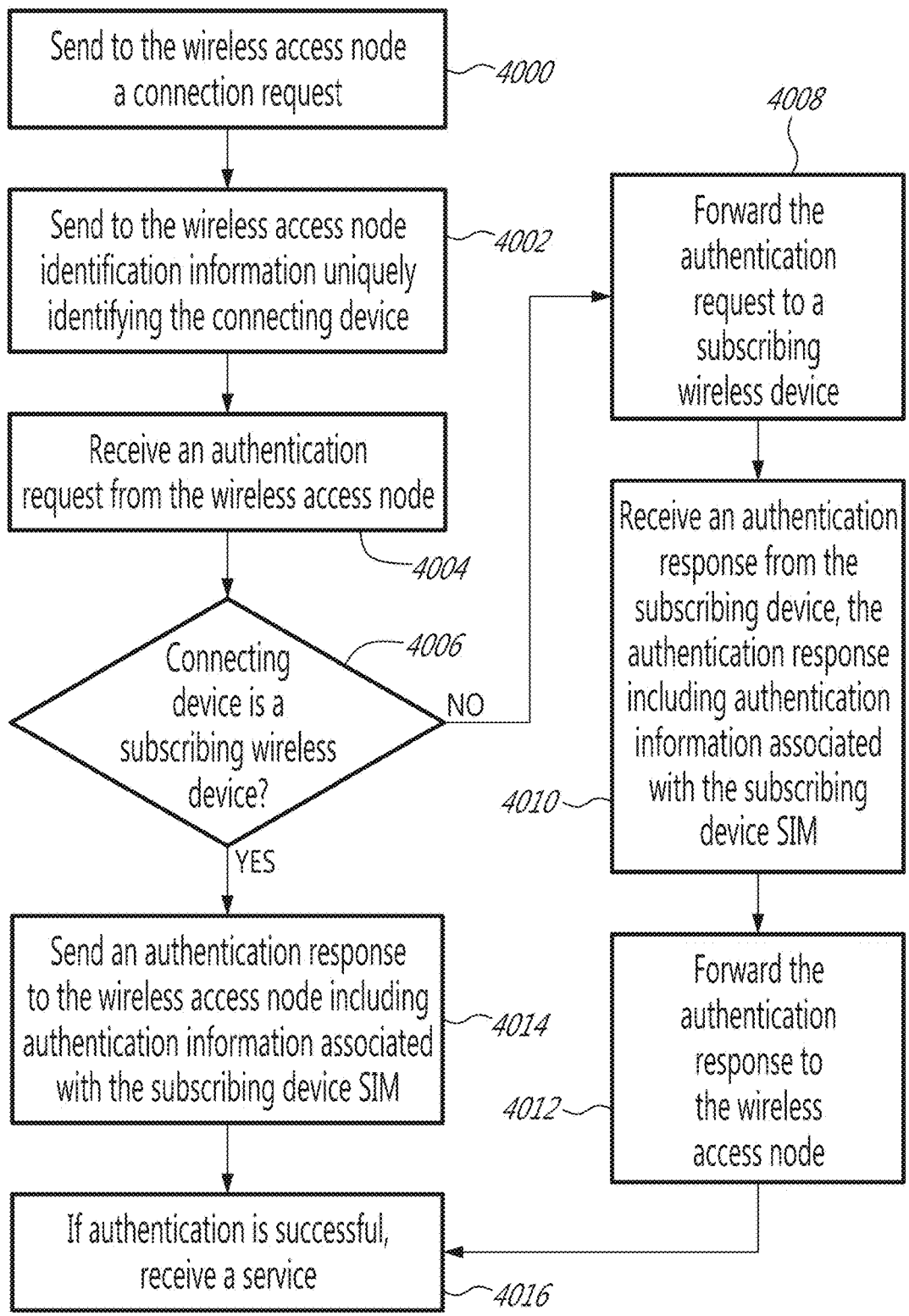
FIG. 6 illustrates a process for a connecting device to receive a service according to one example embodiment of the present disclosure.

FIG. 6 illustrates a process for a connecting device such as either a subscribing wireless device (e.g. UE 30) or a non-subscribing WLAN device 42, 44, 46 to receive a service according to one example embodiment of the present disclosure. Beginning at step 4000, the connecting device sends a connection request to a wireless access node (e.g. WLAN node 32). At step 4002, the connecting device sends identification information uniquely identifying the connecting device. In one embodiment, the identification information could be sent as part of the connection request (step 4000) or in another (separate) message, either as self-identification or in response to a request from the wireless access node. At step 4004, the connecting device receives an authentication request from the wireless access node. If the connecting device is a subscribing device (e.g. the UE 30 of FIG. 3), the connecting device authenticates with the wireless access node with its own (configured/provisioned) authentication information by for example, sending an authentication response to the wireless node including authentication information associated with the connecting device's SIM. If, on the other hand, the connecting device is not a subscribing wireless device, it proceeds to authenticate with authentication information of an associated subscribing device's SIM. Specifically, at step 4008, the connecting device forwards the authentication request to a subscribing wireless device, at step 4010 receives an authentication response from the subscribing device that includes authentication information associated with the subscribing device's SIM and at step 4012, forwards the authentication response to the wireless access node. In either case, if authentication is successful, the connecting device is able to receive an authorized service (e.g. a subscribed service) from an operator's core network.

FIG. 7 is a block diagram of an exemplary embodiment of a wireless access node 50 (such as the WLAN access node 32 of FIG. 3) according to one embodiment of the present disclosure. As illustrated, the wireless access node 50 includes a transceiver 52 one or more processor(s) 54, memory 56 which includes a service establishment module 58. In one embodiment, the transceiver 52 may be replaced by a transmitter and a receiver (not shown). The service establishment module 58 is configured to perform the service establishment functionality of the wireless access node described above (in relation to the WLAN access node 32 of FIGS. 3, 4 and 5) which, as noted above may include the establishment of a session with a packet gateway to obtain a network service and/or the provision of a service such as an NSWO and/or some other mobility service. The service establishment module 58 is implemented at least partially in the memory 56 in the form of software or instructions executed by the processor(s) 54 within the wireless access node 50 or distributed across two or more access nodes (e.g., the wireless access node 50 and another access node). In another example, the processor(s) 54 includes one or more hardware components (e.g., Application Specific Integrated Circuits (ASICs)) that provide some or all of the service establishment functionality described above. In another embodiment, the processor(s) 54 includes one or more hardware components (e.g., Central Processing Units (CPUs)), and some or all of the service establishment functionality described above is implemented in software stored in, e.g., the memory 56 and executed by the processor 54.

FIG. 8 is a block diagram of an exemplary embodiment of a subscribing wireless device 60 (such as the subscribing UE 30 of FIG. 3) constructed in accordance with one embodiment of the present disclosure. The As illustrated, the subscribing wireless device 60 includes a transceiver 62, one or more processor(s) 64, a subscriber module 72 (e.g. the subscribing UE 30's SIM), and memory 66 which includes an identification information module 68 and an authentication module 70. In one example, both the identification information module 68 and the authentication module 70 include instructions which, when executed by the processor(s) 64, cause the processor(s) 64 to respectively send the identification information and authenticate with a wireless access node using the authentication information stored in the subscribing wireless device's subscriber module 72 (as described in an example in relation to the subscribing UE 30 of FIGS. 3, 4 and 5). The processor(s) 64 includes one or more hardware processing components such as, for example, one or more CPUs, one or more ASICs, or the like. In one embodiment, the transmission of the identification information and authentication processes of the subscribing wireless device 60 described above is implemented at least partially in the processor(s) 64. For example, in one embodiment, the processor(s) 64 includes one or more hardware components (e.g., one or more ASICs) that provide some or all of the functionality described above. In another embodiment, the processor(s) 64 includes one or more hardware components (e.g., Central Processing Units (CPUs)), and some or all of the identification information transmission and authentication functionality described above in relation to is implemented in software stored in, e.g., the memory 66 and executed by the processor(s) 64.

FIG. 9 is a block diagram of an exemplary embodiment of a non-subscribing wireless device 80 (such as the non-subscribing WLAN device 42, 44, 46 of FIG. 3) constructed in accordance with one embodiment of the present disclosure. As illustrated, the non-subscribing wireless device 80 includes a transceiver 82, one or more processor(s) 84 and memory 86 which includes an identification information module 88 and an authentication module 90. In one example, both the identification information module 88 and the authentication module 80 include instructions which, when executed by the processor(s) 64, cause the processor(s) 64 to perform the functionality described above in relation to the WLAN devices 42, 44, 46 of FIGS. 3, 4 and 5) and respectively send the identification information and authenticate with a wireless access node using authentication information stored in a subscriber module of a subscribing wireless device (e.g. the 's subscriber module 72 of FIG. 8). The processor(s) 84 includes one or more hardware processing components such as, for example, one or more CPUs, one or more ASICs, or the like. In one embodiment, the transmission of the identification information and authentication processes of the non-subscribing wireless device 80 described above is implemented at least partially in the processor(s) 84. For example, in one embodiment, the processor(s) 84 includes one or more hardware components (e.g., one or more ASICs) that provide some or all of the functionality described above. In another embodiment, the processor(s) 84 includes one or more hardware components (e.g., Central Processing Units (CPUs)), and some or all of the identification information transmission and authentication functionality described above is implemented in software stored in, e.g., the memory 86 and executed by the processor(s) 84.

Non-Subscribing WLAN Device Specific Processing by WLAN

With the ability to differentiate between different connecting devices, as described above and/or with the ability to identify a connecting device as a non-subscribing WLAN device or a subscribing UE, the additional capabilities identified above as being constrained by conventional mechanisms, including disabling traffic steering, separate S2a sessions, IP mobility continuity and/or core network connection, are made available.

Glossary

In order to facilitate understanding of the description, the following abbreviations are used:
AAA Authentication, Authorization and Accounting
EAP Extensible Authentication Protocol
EPC Evolved Packet Core
IMSI International Mobile Subscriber Identity
IP Internet Protocol
PGW PDN GateWay
RADIUS Remote Authentication Dial In User Service
RAN Radio Access Network
SIM Subscriber Identity Module
SSID Subscriber
TE Tethered Equipment
TWAN Trusted WLAN Access Network
UE User Equipment
UICC Universal Integrated Circuit Card
USIM Universal Subscriber Identity Module
WLAN Wireless Local Area Network The following is also noted in accordance with other contemplated embodiments:

According to one aspect, the present disclosure provides a wireless access node configured to initiate a session with a packet gateway for a connecting device where the connecting device is one of a subscribing wireless device configured with authentication information and a non-subscribing wireless device and where the non-subscribing wireless device is configured to authenticate with the subscribing wireless device's authentication information. The access node includes one or more processors, and memory containing instructions, the instructions when executed by the one or more processors being configured to receive identification information uniquely identifying the connecting device, and based on the identification information received, send a session request message to the packet gateway to establish a session for the connecting device, the session request message including information distinguishing the connecting device from another wireless device configured to authenticate with the authentication information associated with the subscribing wireless device.

According to this aspect, in some embodiments, the connecting device is a non-subscribing wireless device and the other wireless device is a subscribing wireless device. In some other embodiments, the subscribing wireless device is configured for operation with a Subscriber Identity Module (SIM) containing the authentication information and the non-subscribing wireless device is configured for operation without a SIM. In yet some other embodiments, the instructions are further configured to receive an authentication confirmation containing at least one of a subscriber identity associated with the subscribing wireless device SIM and an APN and to send the session request message in response to the authentication confirmation received. In yet some other embodiments, the instructions are further configured to receive the authentication confirmation from one of an Authentication Authorization and Accounting (AAA) server, a Home Subscriber Server (HSS) and a Home Location Register HLR Server. In yet some other embodiments, the subscribing wireless device is a User Equipment (UE) and the non-subscribing wireless device is a Tethered Equipment (TE).

In some other embodiments, the distinguishing information distinguishes the session for the connecting device from an existing session for the other wireless device. In yet some other embodiments, the session for the connecting device and the existing session for the other wireless device are S2a sessions. In yet some other embodiments, the distinguishing information includes at least one of a bearer identity, an Access Point Name (APN) and the identification information. In yet some other embodiments, the at least one of a bearer identity, APN and the identification information is different from at least one of a bearer identity, an APN and identification information associated with an existing session for the other wireless device. In yet some other embodiments, the distinguishing information enables a determination of whether to provide a service to the connecting device based on the identification information.

In some other embodiments, the service is a subscription service includes one of a billing service, a policy service and an internet service, a Voice-over-Internet Protocol (VoIP) service. In yet some other embodiments, the instructions are further configured to receive the identification information in response to a request sent by the wireless access node to the connecting device. In yet some other embodiments, the identification information includes one of a hardware identifier and a Medium Access Control (MAC) address of the connecting device. In yet some other embodiments, the identification information further comprises a Boolean parameter identifying the connecting device as one of a subscribing device and a non-subscribing device.

According to another aspect, the present disclosure provides a method for a wireless access node for initiating a session with a packet gateway for a connecting device where the connecting device is one of a subscribing wireless device configured with authentication information and a non-subscribing wireless device, and where the non-subscribing wireless device is configured to authenticate with the subscribing wireless device's authentication information. According to this aspect, the method includes receiving identification information uniquely identifying the connecting device, and based on the identification information received, sending a session request message to the packet gateway to establish a session for the connecting device, the session request message including information distinguishing the connecting device from another wireless device configured to authenticate with the authentication information associated with the subscribing wireless device.

In this aspect, in some embodiments, the connecting device is a non-subscribing wireless device and the other wireless device is a subscribing wireless device. In some other embodiments, the subscribing wireless device is configured for operation with a Subscriber Identity Module (SIM) containing the authentication information and the non-subscribing wireless device is configured for operation without a SIM. In yet some other embodiments, the method further includes receiving an authentication confirmation containing at least one of a subscriber identity associated with the subscribing wireless device SIM and an APN and sending the session request message in response to the authentication confirmation received. In yet some other embodiments, the receiving includes receiving the authentication confirmation from one of an Authentication Authorization and Accounting (AAA) server, a Home Subscriber Server (HSS) and a Home Location Register HLR Server. In yet some other embodiments, the subscribing wireless device is a User Equipment (UE) and the non-subscribing wireless device is a Tethered Equipment (TE). In yet some other embodiments, the distinguishing information distinguishes the session for the connecting device from an existing session for the other wireless device. In yet some other embodiments, the session for the connecting device and the existing session for the other wireless device are S2a sessions.

In some other embodiments, the distinguishing information comprises at least one of a bearer identity, an Access Point Name (APN) and the identification information. In yet some other embodiments, the at least one of a bearer identity, APN and the identification information is different from at least one of a bearer identity, an APN and identification information associated with an existing session for the other wireless device. In yet some other embodiments, the distinguishing information enables a determination of whether to provide a service to the connecting device based on the identification information.

In other embodiments, the service is a subscription service comprising one of a billing service, a policy service and an internet service, a Voice-over-Internet Protocol (VoIP) service. In yet some other embodiments, the receiving includes receiving the identification information in response to a request sent by the wireless access node to the connecting device. In yet some other embodiments, the identification information comprises one of a hardware identifier and a Medium Access Control (MAC) address of the connecting device. In yet some other embodiments, the identification information further comprises a Boolean parameter identifying the connecting device as one of a subscribing device and a non-subscribing device.

Those skilled in the art will recognize improvements and modifications to the embodiments of the present disclosure. All such improvements and modifications are considered within the scope of the concepts disclosed herein and the claims that follow.

The invention claimed is:

1. A Wireless Local Area Network (WLAN) access node configured to initiate a session with a packet gateway for a connecting device, the connecting device being one of a subscribing wireless device configured with authentication information and a non-subscribing wireless device, the non-subscribing wireless device configured to authenticate with the subscribing wireless device's authentication information, the WLAN access node comprising:
   one or more processors; and
   memory containing instructions, the instructions when executed by the one or more processors being configured to:
   receive identification information uniquely identifying the connecting device;
   based on the identification information received and after the connecting device has been authenticated, send a session request message to the packet gateway to establish a session for the connecting device, the session request message including information distinguishing the connecting device from a different wireless device configured to authenticate with the authentication information associated with the subscribing wireless device;

determine whether traffic steering to disassociate the WLAN and associate with a network providing improved data bandwidth as compared with the WLAN is available to the connecting device based on the distinguishing information; and disable traffic steering when the distinguishing information indicates that the connecting device is a non-subscribing wireless device.

2. The WLAN access node of claim 1 wherein the connecting device is a non-subscribing wireless device and the different wireless device is a subscribing wireless device.

3. The WLAN access node of claim 1 wherein the subscribing wireless device is configured for operation with a Subscriber Identity Module (SIM) containing the authentication information and the non-subscribing wireless device is configured for operation without a SIM.

4. The WLAN access node of claim 3 wherein the instructions are further configured to receive an authentication confirmation containing at least one of a subscriber identity associated with the subscribing wireless device SIM and an Access Point Name (APN) and to send the session request message in response to the authentication confirmation received.

5. The WLAN access node of claim 4 wherein the instructions are further configured to receive the authentication confirmation from one of an Authentication authorization and Accounting (AAA) server, a home Subscriber server (HSS) and a Home location Register HLR Server.

6. The WLAN access node of claim 1 wherein the subscribing wireless device is a User Equipment (UE) and the non-subscribing wireless device is a Tethered Equipment (TE).

7. The WLAN access node of claim 1 wherein the session for the connecting device and an existing session for the different wireless device are S2a sessions.

8. The WLAN access node of claim 1 wherein the distinguishing information comprises at least one of a bearer identity, an Access Point Name (APN) and the identification information.

9. The WLAN access node of claim 8 wherein the at least one of a bearer identity, APN and the identification information is different from at least one of a bearer identity, an APN and identification information associated with an existing session for the different wireless device.

10. The WLAN access node of claim 1 wherein the distinguishing information enables a determination of whether to provide a service to the connecting device based on the identification information.

11. The WLAN access node of claim 10 wherein the service is a subscription service comprising one of a billing service, a policy service and an internet service, a Voice-over-Internet Protocol (VoIP) service.

12. The WLAN access node of claim 1 wherein the instructions are further configured to receive the identification information in response to a request sent by the WLAN access node to the connecting device.

13. The WLAN access node of claim 1 wherein the identification information comprises one of a hardware identifier and a Medium Access Control (MAC) address of the connecting device.

14. The WLAN access node of claim 13 wherein the identification information further comprises a Boolean parameter identifying the connecting device as one of a subscribing device and a non-subscribing device.

15. A method for a Wireless Local Area Network (WLAN) access node for initiating a session with a packet gateway for a connecting device, the connecting device being one of a subscribing wireless device configured with authentication information and a non-subscribing wireless device, the non-subscribing wireless device configured to authenticate with the subscribing wireless device's authentication information, the method comprising:

receiving identification information uniquely identifying the connecting device;

based on the identification information received and after the connecting device has been authenticated, sending a session request message to the packet gateway to establish a session for the connecting device, the session request message including information distinguishing the connecting device from a different wireless device configured to authenticate with the authentication information associated with the subscribing wireless device;

determining whether traffic steering to disassociate the WLAN and associate with a network providing improved data bandwidth as compared with the WLAN is available to the connecting device based on the distinguishing information; and disabling traffic steering when the distinguishing information indicates that the connecting device is a non-subscribing wireless device.

16. The method of claim 15 wherein the connecting device is a non-subscribing wireless device and the different wireless device is a subscribing wireless device.

17. The method of claim 15 wherein the subscribing wireless device is configured for operation with a Subscriber Identity Module (SIM) containing the authentication information and the non-subscribing wireless device is configured for operation without a SIM.

18. The method of claim 17 further comprising receiving an authentication confirmation containing at least one of a subscriber identity associated with the subscribing wireless device SIM and an Access Point Name (APN) and sending the session request message in response to the authentication confirmation received.

19. The method of claim 18 wherein the receiving comprising receiving the authentication confirmation from one of an Authentication Authorization and Accounting (AAA) server, a Home Subscriber Server (HSS) and a Home Location Register HLR Server.

20. The method of claim 15 wherein the subscribing wireless device is a User Equipment (UE) and the non-subscribing wireless device is a Tethered Equipment (TE).

21. The method of claim 15 wherein the session for the connecting device and an existing session for the different wireless device are S2a sessions.

22. The method of claim 15 wherein the distinguishing information comprises at least one of a bearer identity, an Access Point Name (APN) and the identification information.

23. The method of claim 22 wherein the at least one of a bearer identity, APN and the identification information is different from at least one of a bearer identity, an APN and identification information associated with an existing session for the different wireless device.

24. The method of claim 15 wherein the distinguishing information enables a determination of whether to provide a service to the connecting device based on the identification information.

25. The method of claim 24 wherein the service is a subscription service comprising one of a billing service, a policy service and an internet service, a Voice-over-Internet Protocol (VoIP) service.

26. The method of claim 15 wherein the receiving comprises receiving the identification information in response to a request sent by the WLAN access node to the connecting device.

27. The method of claim 15 wherein the identification information comprises one of a hardware identifier and a Medium Access Control (MAC) address of the connecting device.

28. The method of claim 27 wherein the identification information further comprises a Boolean parameter identifying the connecting device as one of a subscribing device and a non-subscribing device.

* * * * *